(12) United States Patent
Mheen et al.

(10) Patent No.: US 11,668,801 B2
(45) Date of Patent: Jun. 6, 2023

(54) LIDAR SYSTEM

(71) Applicant: ELECTRONICS AND TELECOMMUNICATIONS RESEARCH INSTITUTE, Daejeon (KR)

(72) Inventors: Bongki Mheen, Daejeon (KR); Hong-Seok Seo, Daejeon (KR); Gyu Dong Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 732 days.

(21) Appl. No.: 16/575,135

(22) Filed: Sep. 18, 2019

(65) Prior Publication Data

US 2020/0088850 A1    Mar. 19, 2020

(30) Foreign Application Priority Data

Sep. 19, 2018 (KR) .................. 10-2018-0112509

(51) Int. Cl.
*G01S 7/481* (2006.01)
*G01S 7/4863* (2020.01)
*G01S 17/89* (2020.01)

(52) U.S. Cl.
CPC .......... *G01S 7/4817* (2013.01); *G01S 7/4863* (2013.01); *G01S 17/89* (2013.01)

(58) Field of Classification Search
None
See application file for complete search history.

(56) References Cited

U.S. PATENT DOCUMENTS

| 6,133,989 | A | 10/2000 | Stettner et al. |
| 7,969,588 | B2 | 6/2011 | Iwata et al. |
| 9,234,964 | B2 | 1/2016 | Mheen et al. |
| 2010/0321669 | A1* | 12/2010 | Yamada ............... G01C 15/002 356/4.01 |
| 2013/0341486 | A1 | 12/2013 | Oh et al. |
| 2017/0261371 | A1 | 9/2017 | Mheen et al. |
| 2017/0343653 | A1 | 11/2017 | Weinberg |
| 2019/0011562 | A1* | 1/2019 | Pacala ..................... G01S 17/08 |
| 2019/0094347 | A1* | 3/2019 | Singh .................... G01S 7/4972 |
| 2019/0229485 | A1* | 7/2019 | Miwa ................ G02F 1/133553 |
| 2019/0312158 | A1* | 10/2019 | Chen ................ H01L 27/14614 |

FOREIGN PATENT DOCUMENTS

| KR | 20170104879 A | 9/2017 |
| KR | 1020180001777 A | 1/2018 |
| KR | 20180049937 A | 5/2018 |

* cited by examiner

*Primary Examiner* — Eileen M Adams
(74) *Attorney, Agent, or Firm* — Rabin & Berdo, P.C.

(57) ABSTRACT

A LIDAR system is provided. The LIDAR system includes: a light transmitting unit configured to drive a plurality of light emitting elements by light emitting units to irradiate light to different positions of a target object; and a light receiving unit configured to detect light that is reflected at different positions of the target object and then is incident to different light receiving positions through a plurality of light receiving regions.

15 Claims, 12 Drawing Sheets

410

420

710

720

910

920

930

940

LIDAR SYSTEM

CROSS-REFERENCE TO RELATED APPLICATION

This application claims priority to and the benefit of Korean Patent Application No. 10-2018-0112509 filed in the Korean Intellectual Property Office on Sep. 19, 2018, the entire contents of which are incorporated herein by reference.

BACKGROUND OF THE INVENTION

(a) Field of the Invention

The present invention relates to a Laser Imaging, Detection, and Ranging (LIDAR) system.

(b) Description of the Related Art

LIDAR (also referred to as Light Detection And Ranging), which shoots light (laser), then analyzes the light reflected by a target in front thereof, and then provides accurate information about the target object, is the most efficient means of obtaining a three-dimensional image. When using light (laser), LIDAR is attracting the most attention as a three-dimensional image sensor using light (laser) because generating energy and concentrating and transmitting this energy is implemented in a much smaller size in compared to conventional technologies using other microwaves. It is attracting the most attention as an image sensor.

LIDAR may be classified into, for example, a rotary type and an array type according to a method of irradiating light (laser) and receiving reflected light (laser) in various ways in order to obtain a three-dimensional (3D) image.

The LIDAR of the rotary type obtains a 3D image of surroundings by rotating a structure having two or more measurement points. The LIDAR of the array type obtains a 3D image by measuring a time difference of reflected light through an array type of sensor after transmitting a beam to be spread, and is also referred to as flash method.

The LIDAR of the rotary type was promoted to the fastest commercialization due to its simple structure, but it takes up a considerable volume by the motion of the motor itself, and it has a limitation in overcoming various problems resulting from the rotation itself, such that it is hard to make the durability superior. In addition, even when a 3D image having an angle of about 120 degrees rather than 360 degrees is to be obtained at the installation point, there is a problem in the structure itself that the 360-degree rotation cannot be eliminated due to the characteristics of the rotation. As a result, the LIDAR of the rotary type is not advantageous in terms of durability, miniaturization, and diversity of receiving structures.

The LIDAR of the array type is seen as the most ideal structure in terms of durability because it detects light through a detector of an array type after spreading light without any physical driving. However, the method of spreading light drastically reduces the amount of reflected light per unit area of the reflection point, and consequently the reflected light acts as a factor to make the amount of received light very small. For this reason, a method of increasing the pulse peak power of light (laser) to several megawatts is utilized. When using a high power light source, the durability of the entire sensor becomes poor during the transmission and reception of a high power laser, and high power lasers have a limited pulse repetition frequency (PRF). This limitation of the PRF has a disadvantage in that it does not provide a 3D image of a high rate frame.

In addition, in order to increase the resolution of the array-type LIDAR, it is necessary to reduce the pixel interval, that is, the pitch. To do this, the pixel size of the read-out IC (ROIC) that is connected to a two-dimensional light detector with a flip-chip must also be reduced. In general, depending on the area that can be implemented, there are differences in the techniques applicable to a detection circuit. Since it is necessary to store the detection information of individual pulses in a small area, it is difficult to make a pixel having excellent characteristics, and thus there is a problem in that receiving large power laser light is required and eventually a higher laser power is required.

The rotary type and the array type have been used for a long time, but they are not suitable for trends such as the recent trend of miniaturization, durability improvement, and low cost of the LIDAR.

According to the recent trend, there is an optical phased array (OPA) method which is a non-mechanical optical scanning method. This method is to collimate and send light (laser) without spreading it and to send light (laser) output of various phases in the plane where light is emitted by changing the medium that transmits the light (laser). In this case, light may be collimated and output in a predetermined direction through control of light output of various phases, and thus the light transmitting unit of the LIDAR may be configured by changing the direction of light without mechanical movement.

However, this approach causes three major problems. Firstly, the method of changing the medium is controlled by temperature, and there is a problem that it is not easy to keep the control constant and stable. Since the change of the external temperature affects the operation, it is difficult to control the correction of the operation. Secondly, although light of different phases can be collected and propagated in one direction, harmonics are inevitably generated and there is a problem in that there is a side beam in which light (laser) is output in directions other than the main direction. In the active method of receiving light (laser) after transmitting the light (laser), at least the relative output of the side beam should be greatly reduced depending on the distance, which is also not easy. For example, in order to simultaneously perform 1 m detection and 100 m detection, the size of the side beam should be controlled to at least 40 dB or less, which is difficult to control. Therefore, most OPA-type LIDAR has a problem in that it is difficult to increase the maximum detection distance. Third, since it is difficult to increase the size of the output light (laser) due to the reasons described above, there is a problem in that the sensitivity of the reception light detector must be increased very much in order to increase the detection distance. The key reason why the size of the light (laser) is difficult to increase is due to the nature of the phase-controlling medium, and thus highly sensitive light detectors should be used to detect long distances with a small laser output. For example, in order to solve such a problem, a technique such as TCSPC (Time Correlated Single Photon Counting) using light (laser) irradiation time information may be utilized. The problem with this method is that it is sensitive to changes in illuminance such as sunlight, and also relies on expensive optical filters to overcome such problems.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a LIDAR system having advantages of scanning an area in a constant direction without spreading the beam without mechanical driving.

In addition, the present invention has been made in an effort to provide a LIDAR system having advantages of having a structure for receiving the light that is scanned on and reflected by the target object without mechanical driving.

Further, the present invention has been made in an effort to provide a LIDAR system having advantages of operating efficiently by varying the switching of the light receiver according to the position of the transmission beam.

An exemplary embodiment of the present invention provides a Laser Imaging, Detection, and Ranging (LIDAR) system, including: a light transmitting unit configured to drive a plurality of light emitting elements by light emitting units to irradiate light to different positions of a target object; and a light receiving unit configured to detect light that is reflected at different positions of the target object and then is incident to different light receiving positions through a plurality of light receiving regions.

In an implementation, the light transmitting unit may include a light emitting element array in a two-dimensional array including the plurality of light emitting elements, and the light receiving portion may include a plurality of light detector cells corresponding to the plurality of light receiving regions.

In an implementation, a light receiving position indicating which light receiving area of the plurality of light receiving areas is to detect light may be determined based on a position of a light emitting element driven for each light emitting unit in the light emitting element array.

In an implementation, the one light-receiving region may include at least one light detector cell, and a light detector cell of a corresponding light receiving region according to the determined light receiving position may be driven to output an electrical signal corresponding to incident light.

In an implementation, the light emitting unit may be a horizontal line or a vertical line of the light emitting element array, and the light emitting elements emitting light by horizontal lines or vertical lines of the light emitting element array may be driven so that linear light in a horizontal direction or a vertical direction is irradiated.

In an implementation, the light transmitting unit may further include a light transmitting optical unit configured to transmit light from the light emitting element, and the light receiving unit may further include a light receiving optical unit configured to collect incident light and provide the light to the plurality of light detector cells.

In an implementation, the light transmitting optical unit may include an optical system configured to extend the light from the light emitting element in a longitudinal direction and transmitting the light as linear light.

In an implementation, the plurality of light emitting elements may be sequentially driven for each light emitting unit, and the light receiving unit may detect incident light through a plurality of different light receiving regions corresponding to the sequentially driven light emitting elements.

In an implementation, the light transmitting unit may further include a light modulator configured to modulate and output light output from the plurality of light emitting elements at different frequencies, and the light receiving unit may further include a light demodulator configured to demodulate incident light with different frequencies and to provide it to the plurality of light detector cells.

In an implementation, all the light emitting elements of the light emitting element array may be driven at the same time so that the light from all the light emitting elements is modulated at different frequencies and transmitted by the light modulator. The plurality of light detector cells may all be driven and then frequency-specific light detection may be performed by demodulation according to different frequencies through the light demodulator.

In an implementation, when misalignment is generated by the light emitting unit and the light receiving unit and distortion of data is generated thereby, distortion information may be corrected with respect to data obtained in real time based on misalignment correction data obtained through a separate process.

DETAILED DESCRIPTION OF THE EMBODIMENTS

Figure 1:
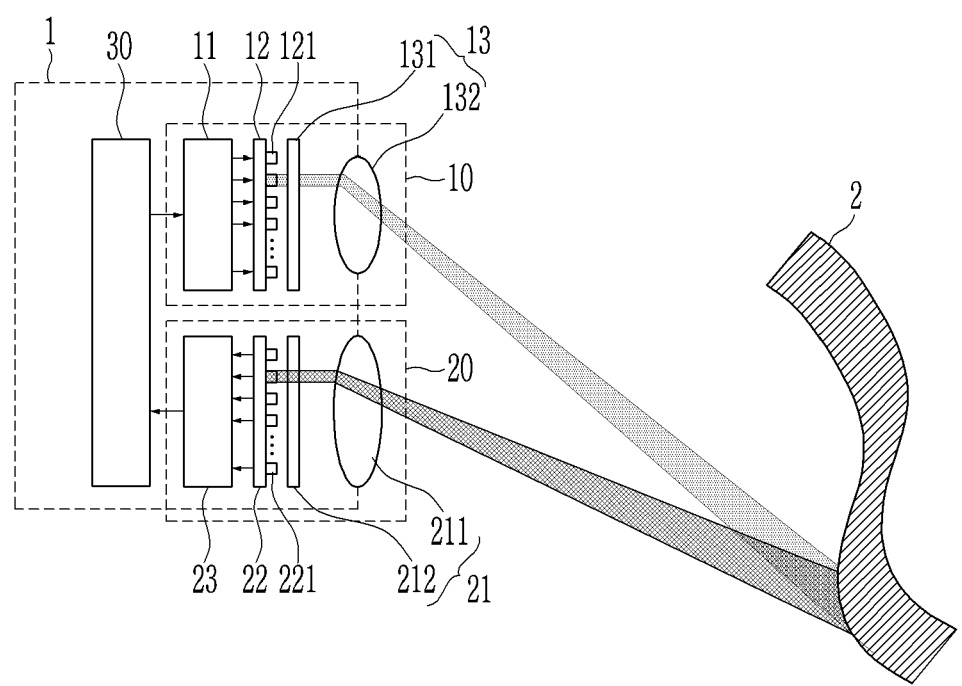
FIG. 1 is a diagram showing the structure of a LIDAR system according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, in addition, unless explicitly described to the contrary, the word "comprise" and variations such as "comprises" or "comprising" will be understood to imply the inclusion of stated elements but not the exclusion of any other elements.

The expressions described in the singular may be interpreted as singular or plural unless an explicit expression such as "one", "single", and the like is used.

In addition, terms including ordinal numbers such as "first" and "second" used in embodiments of the present disclosure may be used to describe components, but the components should not be limited by the terms. The terms are only used to distinguish one component from another. For example, without departing from the scope of the present disclosure, the first component may be referred to as the second component, and similarly, the second component may be referred to as the first component.

Hereinafter, a LIDAR system according to an embodiment of the present disclosure will be described with reference to the drawings.

An embodiment of the present invention provides a LIDAR system that scans in a constant direction without spreading a beam.

FIG. 1 is a diagram showing the structure of a LIDAR system according to an embodiment of the present invention.

A LIDAR system 1 according to an embodiment of the present invention, as shown in FIG. 1, includes a light transmitting unit 10 for irradiating light (or a laser) to a target object 2, a light receiving unit 20 for receiving light reflected by the target object 2, and an integrated controller 30.

The light transmitting unit 10 includes a driving unit 11 for outputting a driving signal according to a control signal, a light emitting unit 12 in which light emitting elements emit light individually according to the driving signal, and a light transmitting optical unit 13 for condensing and transmitting the emitted light. The light emitting unit 12 includes a plurality of light emitting elements (denoted by reference numeral 121), and each light emitting element 121 operates individually according to the driving signal provided from the driving unit 11. The light emitting element 121 includes various elements for generating light, such as a laser diode, a light emitting diode (LED), an optical fiber, and the like, and is not limited thereto. The light emitting unit 12 may be implemented in the form of a module in which the light emitting elements 121 are integrated. In FIG. 1, it is shown that the light emitting elements 121 are arranged in a row in a cross-sectional view from the top or from the side, but the light emitting elements 121 may be configured as a light emitting element array configured as a two-dimensional array. A plurality of light emitting elements are referred to as a light emitting element array.

The driving unit 11 outputs a driving signal for individually driving the light emitting elements 121 of the light emitting unit 12 according to a control signal provided from the integrated controller 30. One light emitting element corresponding to one driving signal may be driven to emit light, and a plurality of light emitting elements may be driven simultaneously according to a plurality of driving signals. The direction of the transmitted light may be determined or changed according to which light emitting element is applied with a driving signal.

The light transmitting optical unit 13 condenses light emitted from the light emitting elements 121 of the light emitting unit 12 and transmits the light in a predetermined direction. To this end, the light transmitting optical unit 13 according to the embodiment of the present invention includes a first light transmitting optical system 131 for condensing light emitted from the light emitting elements 121 of the light emitting unit 12, and a second light transmitting optical system 132 for transmitting the light condensed. For example, the first light transmitting optical system 131 may mainly act as a part that condenses light with a collimator, etc., and the second light transmitting optical system 132 may serve to determine a path of a beam by including a lens, a mirror, and the like. The first light transmitting optical system 131 and the second light transmitting optical system 132 may be implemented as one optical system.

The present invention is not limited thereto, and the light transmitting optical unit 13 may have a structure including two optical systems as shown in FIG. 1, or may have a structure including one optical system, or more than two optical systems.

The light transmitted by the light transmitting unit 10 having such a structure, that is, the transmitting beam, is irradiated to the target object 2. In FIG. 1, only light emitted by one light emitting element is transmitted to and reflected from the target object 2, but light emitted and transmitted by two or more light emitting elements may be irradiated onto the target object. The position at which light is irradiated to the target object 2 varies depending on the light emitting device being driven.

The light emitting element array is driven by a predetermined unit for light emitting. The predetermined unit may be referred to as a light emitting unit, and the light emitting unit includes at least one light emitting element. For example, in a light emitting element array composed of a two-dimensional array, light emitting elements arranged in a row in a horizontal direction (or in a vertical direction) are grouped into one light emitting unit. Light emitting elements in the light emitting element array are sequentially driven by the light emitting unit. As the light emitting elements arranged in a row in the horizontal direction or in the vertical direction are driven, linear light is output and irradiated to the target object. The position at which light is irradiated to the target object is changed depending on the light emitting elements driven in the light emitting unit, and as a result, the target object can be scanned without using mechanical means. The light emitting unit of the present invention is not limited to the above-described one, and may be configured in various forms including at least one light emitting element in the light emitting element array. Here, the number of light emitting elements constituting the light emitting unit, the order of driving for each light emitting unit, a driving speed, and the like may be adjusted to adjust the shape, the range, the direction, the speed, and the like of the light irradiated to the target object 2.

Meanwhile, the light receiving unit 20 includes a light receiving optical unit 21 for receiving the light reflected by the target object 2 after being irradiated to the target object 2 by the light transmitting unit 10, a light detecting unit 22 for outputting an electrical signal corresponding to the light received by the light receiving optical unit 21, and a signal processor 23 for processing the signal output from the light detecting unit 22 and outputting it to the integrated controller 30.

The light receiving optical unit 21 receives the reflected and incident light. To this end, the light receiving optical unit 21 according to the embodiment of the present invention includes a first light receiving optical system 211 for receiving the reflected and incident light, and a second light receiving optical system 212 for condensing and outputting the received light. The first light receiving optical system 211 and the second light receiving optical system 212 may be implemented as one optical system.

However, the present invention is not limited thereto, and the light receiving optical unit 21 may have a structure including two optical systems as shown in FIG. 1, or may have a structure including one optical system, or more than two optical systems.

The light detecting unit 22 includes a plurality of light detectors 221, and each light detector 221 individually detects light output from the light receiving optical unit 21 and outputs a corresponding electrical signal.

The signal processor 23 receives and processes a signal output from each light detector 221 of the light detecting unit 22, and transmits the signal to the integrated controller 30. For example, the signal processor 23 may integrate the received signals and transfer them to the integrated controller 30.

To this end, the signal processor 23 may include a signal combiner that adds a signal output from each light detector 221. The signal combiner may be connected to each light detector 221 through a separate switch. Specifically, switches that operate separately are positioned between each light detector 221 and a signal combiner so that a signal from the light detector 221 connected to the operated switch according to each switch's operation is provided to the signal combiner. Accordingly, the signal from the specific light detector 221 may be selectively input by the signal combiner to the signal processor 23 according to the selective operation of the switches. The operation of these switches can be controlled by the integrated controller 30.

In addition, the signal processor 23 may perform a process such as noise removal, amplification, and the like, to the signal, and provide it to the integrated controller 30.

Information based on the light received by the light receiving unit 20 having such a structure is transmitted to the integrated controller 30 and used to obtain three-dimensional coordinates for the target object. The integrated controller 30 generates a control signal for individually driving each light emitting element of the light transmitting unit 10, and provides the control signal to the driving unit 11 of the light transmitting unit 10. The integrated controller 30 may generate a control signal according to the driving pattern. The driving pattern includes the number of light emitting elements constituting the light emitting unit, an order of driving for each light emitting unit, a driving speed, and the like in the light emitting element array.

As the driving state of the light emitting elements of the light transmitting unit 10 is changed according to the driving pattern, the incident position at which the light reflected from the target object 2 is incident on the light receiving unit 20 may be changed. Also, the incident position may be changed for each time.

In the LIDAR system according to the embodiment of the present invention having such a structure, as the integrated controller 30 outputs a control signal for irradiating light in a predetermined direction, the driving unit 11 drives a driving signal for driving the corresponding light emitting element 121 so that the corresponding light emitting element 121 of the light emitting unit 12 emits light. Light generated by the light emission of the light emitting element 121 is transmitted in a predetermined direction through the first light transmitting optical system 131 and the second light transmitting optical system 132, and then is irradiated to the target object 2.

The light irradiated onto the target object 2 is reflected by the target object 2, and the light receiving unit 20 receives the reflected light. Light received through the first light receiving optical system 211 and the second light receiving optical system 212 of the light receiving unit 20 is output as an electrical signal through the light detector 221 of the light detecting unit 22. The received signal is processed by the signal processor 23 and transferred to the integrated controller 30, and is used to obtain three-dimensional coordinates for the target object 2.

In the LIDAR system according to the embodiment of the present invention operating as described above, the light transmitting unit 10 is a non-mechanical light transmitting module that does not include mechanical means (for example, a motor). The light transmitting unit 10 according to an embodiment of the present invention scans in a predetermined direction without spreading light, and the configuration and operation of the light emitting element for this purpose will be described in more detail.

Figure 2:
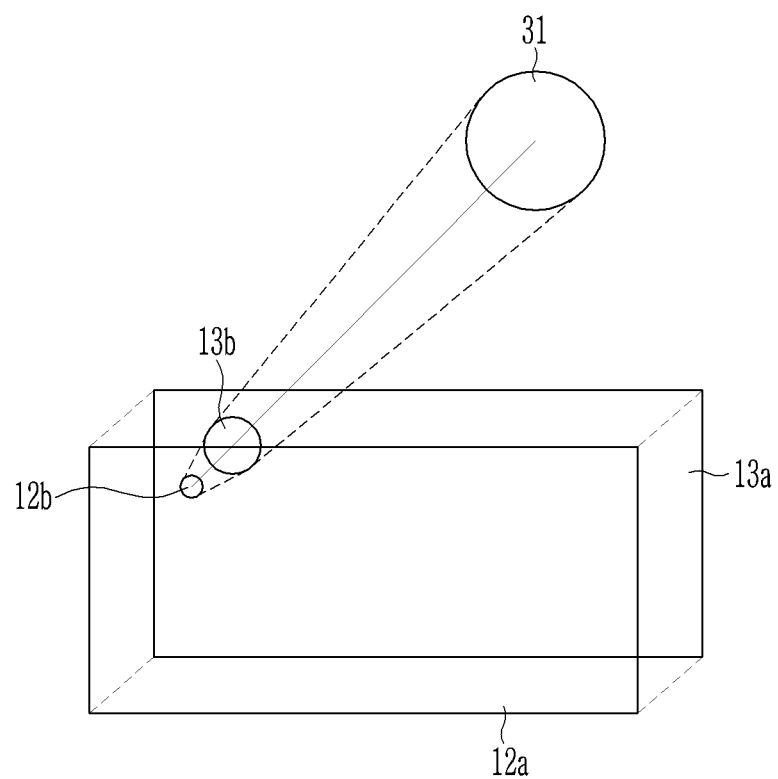
FIG. 2 is an exemplary diagram illustrating a case in which one light emitting element is driven in a light transmitting unit according to an exemplary embodiment of the present invention.

FIG. 2 is an exemplary diagram illustrating a case in which one light emitting element is driven in a light transmitting unit according to an exemplary embodiment of the present invention.

In the single cell mode in which one light emitting element is driven in the light emitting unit 12 of the light transmitting unit 10 (even in the case in which the light emitting unit 12 includes one light emitting element), as shown in FIG. 2, a light emitting position 12b may be displayed on a light emitting material surface 12a.

Here, the light emitting material surface 12a is a material surface including a light emitting element, and corresponds to the light emitting unit. The light emission position 12b which is the position which light emits in the light emitting material surface 12a is formed. The light emitting position 12b corresponds to the position of the light emitting element, and one light emitting position 12b is displayed in response to the driving of one light emitting element.

An optical material 13a is positioned in the front portion corresponding to the light emitting direction of the light emitting material surface 12a, and the optical material 13a corresponds to the light transmitting optical unit. An optical part 13b of the optical material 13a for controlling the light emission characteristic of the light generated at the light emitting position 12b may be as shown in FIG. 2. The optical part 13b shows the part in which the light emitted at the light emission position 12b is controlled by the optical material 13a.

In general, in order to send the light far, a divergence angle of the light after passing through the optical part 13b of the optical material 13a is designed to be smaller than an angle of the light emitted at the light emission position 12b of the light emitting material surface 12a. The light emitted in this way is irradiated to the target object, and then an optical irradiation surface 31 is formed. The optical irradiation surface 31 represents a region in which light is irradiated and reflected on the target object.

Since the light passing through the optical part 13b diverges with distance, the larger the distance is, the larger the size of the optical irradiation surface 31 is in proportion to the distance, and the intensity per unit area of the reflected light is inversely proportional to the square of the distance. The light irradiated onto the target object is attenuated and reflected by the reflectance of the reflection position and various other factors.

Figure 3:
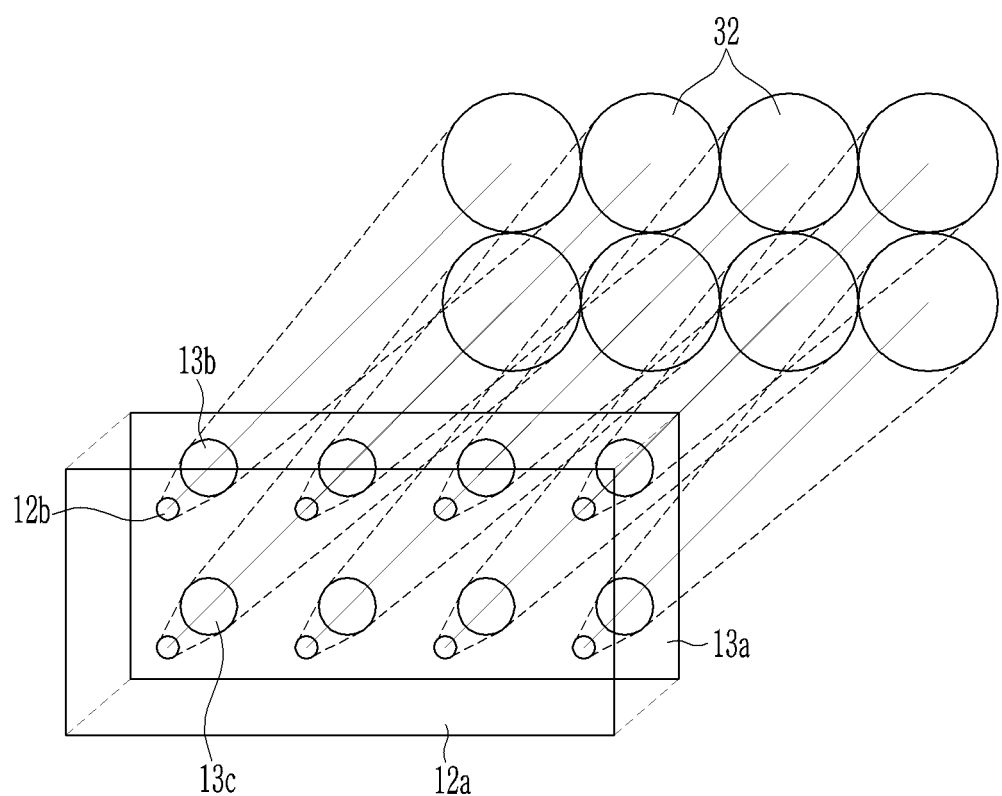
FIG. 3 is an exemplary diagram illustrating a case in which a plurality of light emitting elements are driven in a light transmitting unit according to an exemplary embodiment of the present invention.

FIG. 3 is an exemplary diagram illustrating a case in which a plurality of light emitting elements are driven in a light transmitting unit according to an exemplary embodiment of the present invention.

In the multi-cell mode in which the plurality of light emitting elements are driven in the light emitting unit 12 of the light transmitting unit 10, as shown in FIG. 3, a plurality of light emitting positions 12c may be displayed on a light emitting material surface 12a according to the emitting operation of the plurality of light emitting elements. The plurality of light emitting positions 12c corresponding to the light emitting element array are referred to as a light emitting position array.

An optical part 13c of the optical material 13a for controlling the light emission characteristic of the light emitted from the light emitting position array 12c may be as represented in FIG. 3. A plurality of optical parts 13c are formed corresponding to the plurality of light emitting positions, and the plurality of optical parts 13c are referred to as an optical part array.

In general, in order to send the light far, the divergence angle of the light after passing through the optical part array 13c of the optical material 13a is designed to be smaller than the angle of the light emitted from the emission position array 12c of the light emitting material surface 12a. The light emitted in this way is irradiated to the target object, and a plurality of optical irradiation surfaces 32 are formed. The plurality of optical irradiation surfaces 32 are referred to as optical irradiation surface array 32.

Since the light passing through the optical part array 13c diverges with distance, the larger the distance is, the greater the size of one beam in proportion to the distance is, and the intensity per unit area of the reflected light is inversely proportional to the square of the distance. The light irradiated onto the target object is attenuated and reflected by the reflectance of the reflection position and various other factors.

As described above, the light emitting element array in which the light emitting unit 12 of the light transmitting unit 10 is driven in the multi-cell mode may be driven in various forms according to the driving pattern. For example, in a light emitting element array composed of a two-dimensional array, light emitting elements arranged in a row in a horizontal direction (or in a vertical direction) constitute one light emitting unit and light emitting elements for each light emitting unit are driven. As the light emitting elements arranged in a row in the horizontal direction (or in a vertical direction) are driven, linear light is output and irradiated to the target object. As such, the position at which light is irradiated to the target object is changed by the light emitting elements driven in the light emitting unit, and as a result, the target object can be scanned without using mechanical means.

A three-dimensional point cloud for the target object may be obtained by grouping a plurality of light emitting elements into light emitting units and selectively driving the light emitting elements. In this case, the three-dimensional point cloud is obtained through interworking with the light receiving unit, which will be described in more detail later.

Figure 4:
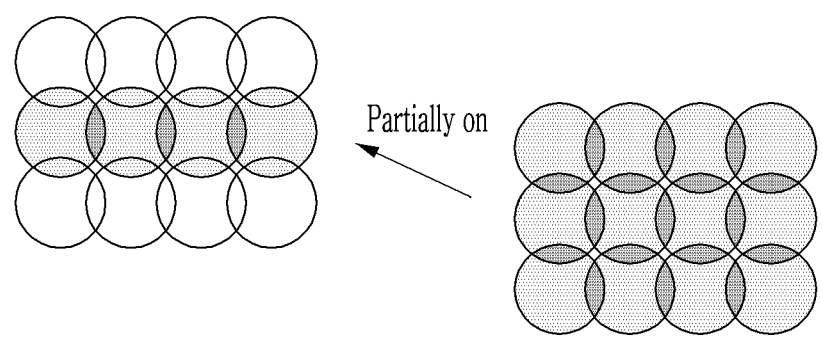
FIG. 4 illustrates an example of driving a light emitting element in a light emitting element array according to an exemplary embodiment of the present invention.
Figure 4:
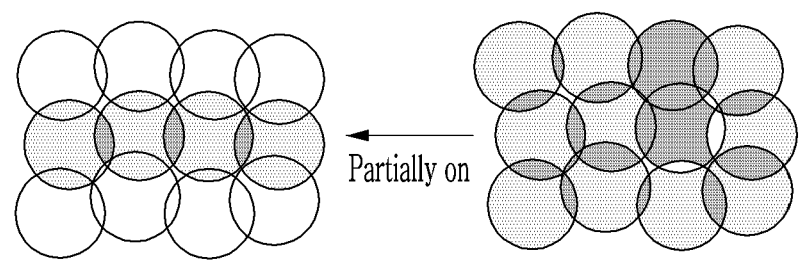

FIG. 4 illustrates an example of driving a light emitting element in a light emitting element array according to an exemplary embodiment of the present invention.

As illustrated in FIG. 4, all of the light emitting elements constituting the light emitting element array may be driven to generate light, thereby generating a plurality of light transmitting beams. Also, the light transmitting beams may be generated by grouping light emitting elements by a row unit and driving the light emitting elements positioned in a specific row. Although an example of generating a linear light transmission beam in the horizontal direction is illustrated, a linear light transmission beam in the vertical direction may be generated. For example, the light emitting elements may be grouped by a column unit, and the light emitting elements positioned in a specific column may be driven to generate a light transmission beam in the vertical direction. Herein, although a linear light transmission beam is generated, the present invention is not limited thereto, and various types of transmission beams that may be formed by driving a plurality of light emitting elements may be generated.

In the light emitting element array driven as described above, the light emitted from adjacent light emitting elements may be overlapped due to the light emission characteristic of the light emitting element (410 of FIG. 4). There may also be misalignment of light emitted from a light emitting element (420 of FIG. 4). The misaligned information can be detected later in the transmission/reception block, and the misaligned information can be used to automatically receive corrected information by reflecting the misaligned information in the detection of the three-dimensional image.

There may be a variety of ways to obtain data for correction. As an example, when acquiring image information based on a known shape of an object (for example, a checkered pattern), the data obtained before correction may be data of a distorted shape in which an error (a positional error of the light source above, optical system positional error, etc.) generated by a structure according to an embodiment of the present invention is reflected as it is. The parameter that makes the data of the distorted shape into an object of a known shape is correction data for data correction. As a result, the misaligned information of the light transmitting unit and the light receiving unit is stored in the correction data, and once the correction data is obtained, it is not changed. Thus, data in which the distortion is minimized by reflecting the correction data in real time in subsequent measurements can be obtained.

This method utilizes the fact that the error generated by the structure according to the embodiment of the present invention does not change significantly with time and the various images are input as an input image.

Figure 5:
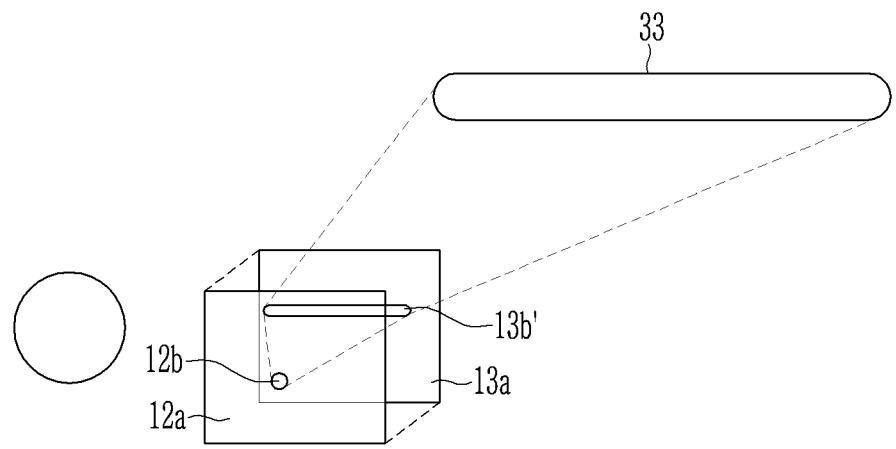
FIG. 5 is an exemplary diagram illustrating a case in which a linear beam is generated in a single cell mode in a light transmitting unit according to an exemplary embodiment of the present invention.

FIG. 5 is an exemplary diagram illustrating a case in which a linear beam is generated in a single cell mode in a light transmitting unit according to an exemplary embodiment of the present invention.

In the single cell mode in which one light emitting element is driven in the light emitting unit 12 of the light transmitting unit 10, as shown in FIG. 5, one light emitting position 12b may be displayed on the light emitting material surface 12a according to light emission of the single light emitting element. Here, the light emitting element may use an optical element having excellent light (or laser) quality, such as a single mode optical fiber, or a laser diode having an optimized divergence angle, and may use various means such as an array pixel or an array optical fiber.

In particular, the light from the light emitting element may be extended in the longitudinal direction or linearly as shown in FIG. 5 through an optical part 13b' of the optical material 13a. For convenience of description, the light extended in the longitudinal direction or linearly is referred to as a "linear beam".

In general, the divergence angle of the light after passing through the optical part 13b' of the optical material 13a is designed to be smaller than the angle of the light emitted at the light emitting position 12b of the light emitting material surface 12a to send the light away, but in an embodiment of the present invention, the optical part 13b' of the optical material 13a is optimized to have a desired aspect ratio while extending light in a longitudinal direction or linearly. For example, a light transmitting optical unit corresponding to the optical part 13b' may include an optical component (for example, a cylindrical mirror) that extends light in the longitudinal direction or linearly. In particular, the divergence angle of the optical part 13b' of the optical material 13a may be configured differently with respect to the vertical direction and the horizontal direction in order to configure the linear beam.

The linear beam extended through the optical part 13b' of the optical material 13a is irradiated to the target object, so that an optical irradiation surface 33 is formed. As the linear beam is irradiated, as shown in FIG. 5, the optical irradiation surface 33 which has a long shape in a longitudinal direction or linearly is formed.

Figure 6:
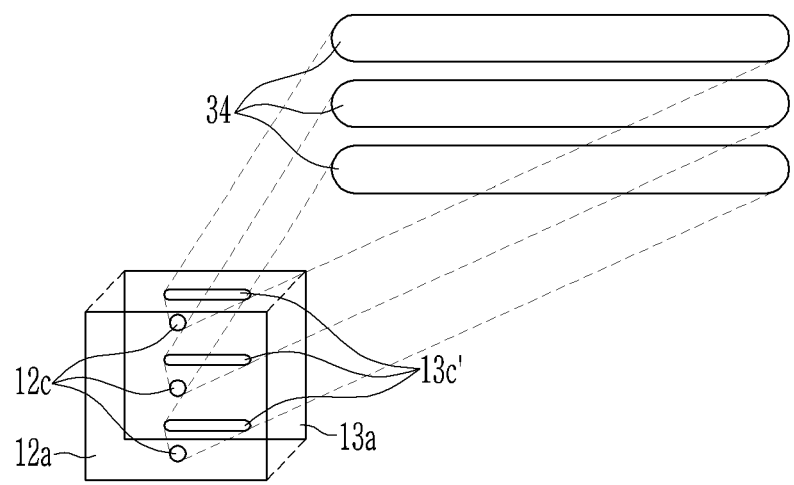
FIG. 6 is an exemplary diagram illustrating a case in which a linear beam is generated in a multi-cell mode in a light transmitting unit according to an embodiment of the present invention.

FIG. 6 is an exemplary diagram illustrating a case in which a light transmitting unit generates a linear beam in a multi-cell mode according to an embodiment of the present invention.

In the multi-cell mode in which the light emitting unit 12 of the light transmitting unit 10 drives a plurality of light emitting elements, as shown in FIG. 6, a plurality of light emitting positions, that is, a light emitting position array 12c, are displayed on the light emitting material surface 12a. An optical part array 13c' is formed in the optical material 13a for controlling the light emission characteristic of the light emitted from the light emitting position array 12c in front of the light emitting material surface 12a.

In this case, each light emitting element constituting the light emitting element array may use an optical element having excellent light (or laser) quality, such as a single mode optical fiber, or a laser diode having an optimized divergence angle. Light from the light emitting position array 12c corresponding to the light emitting element array is extended by the optical material 13a, and in particular, the light from the light emitting position array 12c is extended in a longitudinal direction or linearly through the optical part array 13c' of the optical material 13a, as shown in FIG. 6

In general, the divergence angle of the light after passing through the optical part array of the optical material 13a is designed to be smaller than the angle of light emitted from the light emitting position array 12c of the light emitting material surface 12a to send the light away, but in an embodiment of the present invention, the optical part array 13c' of the optical material 13a is optimized to have a desired aspect ratio while extending light in the longitudinal direction or linearly. In particular, the divergence angle of the optical part 13c' of the optical material 13a may be configured differently with respect to the vertical direction and the horizontal direction to form a "linear beam".

The linear beam extended through the optical part array 13c' of the optical material 13a is irradiated to the target object to form the optical irradiation surface array 34. As the linear beam is irradiated, as in FIG. 6, an optical irradiation surface array 34 which has a long shape in a longitudinal direction or linearly is formed.

Here, an example of generating a linear beam in the horizontal direction is illustrated as an example, but a linear beam in the vertical direction may be generated. For example, the aspect ratio may be adjusted to allow the light emitted by the light emitting element to linearly expand in the vertical direction.

Figure 7:
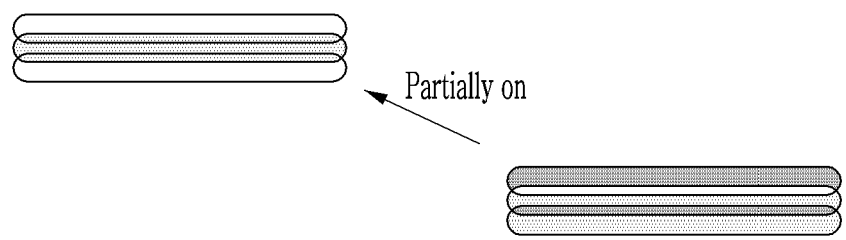
FIG. 7 is a diagram illustrating an example of driving the light emitting element array illustrated in FIG. 6.
Figure 7:
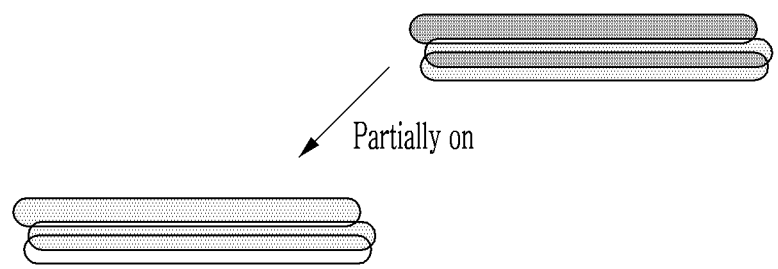

FIG. 7 is a diagram illustrating an example of driving the light emitting element array illustrated in FIG. 6.

In the structure in which linear beams are generated and extended through the optical part array as shown in FIG. 6, as illustrated in FIG. 7, all light emitting elements constituting the light emitting element array are driven, thereby generating a plurality of linear light transmitting beams. Also, the linear light transmitting beams may be generated by grouping light emitting elements by a row unit and driving the light emitting elements positioned in a specific row. Although an example of generating a linear light transmission beam in the horizontal direction is illustrated, a linear light transmission beam in the vertical direction may be generated.

In the light emitting element array driven as described above, the light emitted from adjacent light emitting elements may be overlapped due to the light emission characteristic of the light emitting element (710 of FIG. 7). There may also be misalignment of light emitted from a light emitting element (720 of FIG. 7). The misaligned information can be detected later in the transmission/reception block, and the misaligned information can be used to automatically receive corrected information by reflecting the misaligned information in the detection of the three-dimensional image. The method for obtaining the data for correction is the same as the method described above, the correction data can be obtained in the above described method, and the data without distortion can be obtained by reflecting the correction data in real time.

As described above, when the light transmitting unit includes a light emitting element array and the light emitting element array is driven for each light emitting unit, the light receiving unit according to the embodiment of the present invention may have the following structure.

Figure 8:
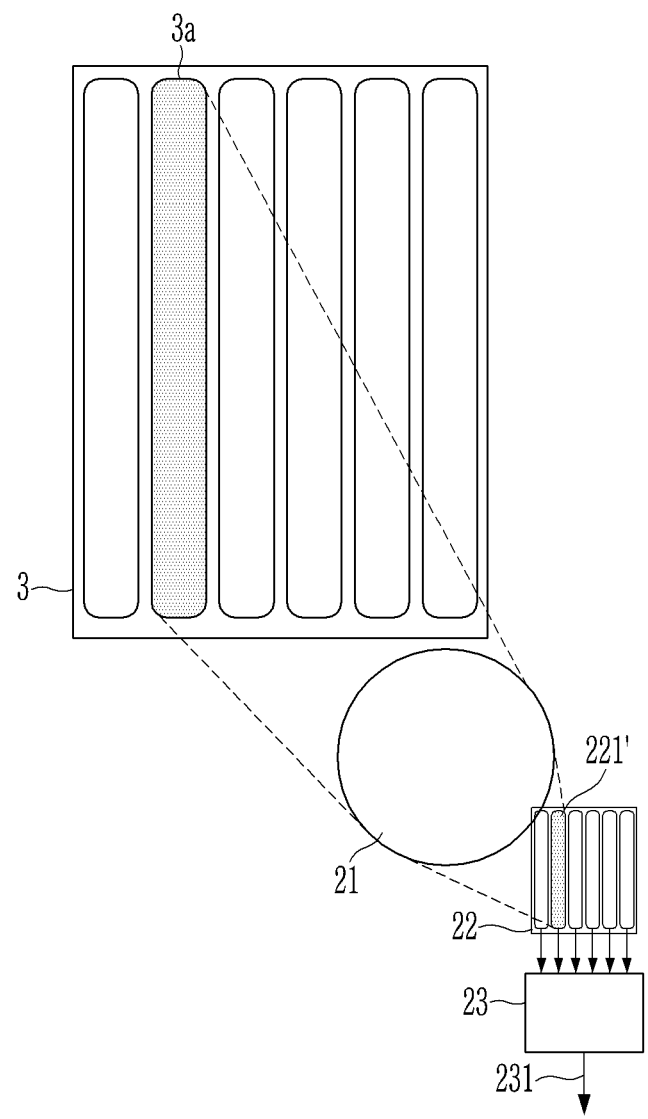
FIG. 8 is a diagram illustrating a structure of a light receiving unit according to an embodiment of the present invention.

FIG. 8 is a diagram illustrating a structure of a light receiving unit according to an embodiment of the present invention.

The light receiving unit 20 includes a light receiving optical unit 21, a light detecting unit 22, and a signal processor 23, and the light detecting unit 22 includes a plurality of light detector cells 221'.

When the light emitting element array of the light transmitting unit is driven for each light emitting unit, as described above, an optical irradiation surface array 3 is formed on the target object by the light transmitted for each light emitting unit. The light detecting unit 22 may include a plurality of light receiving regions so that the light reflected from each of the optical irradiation surfaces of the optical irradiation surface array 3 is detected through a specific light receiving region. A plurality of light detectors are grouped in cell units to form a plurality of light detector cells 221'. One light receiving region may be composed of at least one light detector cell. Here, an example in which one light receiving region includes one light detector cell is described, but the present invention is not limited thereto.

Figure 9:
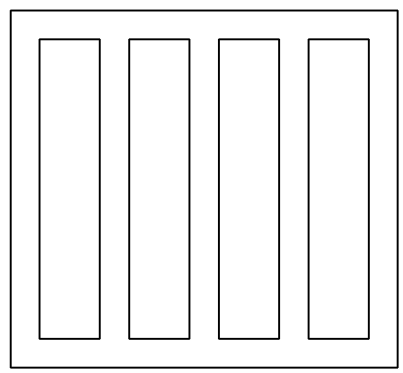
FIG. 9 is a diagram illustrating a light detector according to an embodiment of the present invention.
Figure 9:
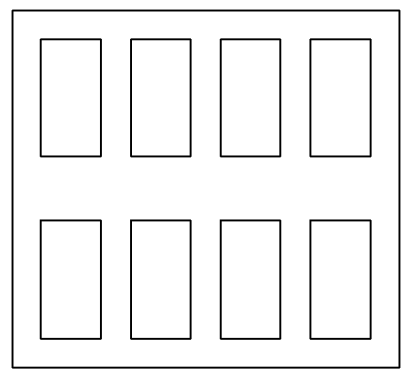
Figure 9:
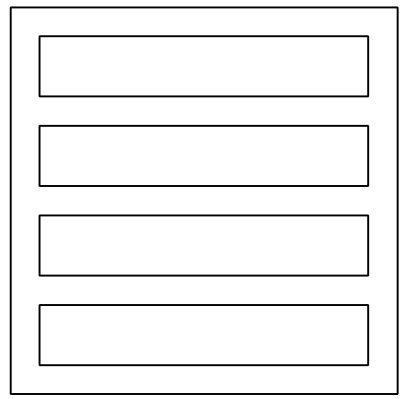
Figure 9:
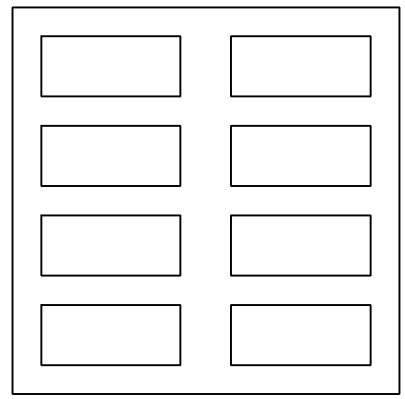

FIG. 9 is a diagram illustrating a light detector according to an embodiment of the present invention.

As illustrated in FIG. 9, the light detecting unit 22 according to an exemplary embodiment of the present invention may configure a plurality of light detector cells by dividing a large area light detector.

For example, as shown in 910 and 920 of FIG. 9, a large area light detector may be divided in a vertical direction to configure a plurality of light detector cells, or as shown in 930 and 940 of FIG. 9, a large area light detector may be divided in a horizontal direction to configure a plurality of light detector cells. In particular, the output port can be arranged above and below in 920 of FIG. 9, and in this case, a read-out IC (ROIC) may be arranged above and below. Similarly, in 940 of FIG. 9, the ROIC may be arranged on the left and right. The present invention is not limited to that illustrated in FIG. 9, and may implement various types of light detector cells.

The light detector constituting the light detecting unit 22 may be implemented in various ways, for example, a PN junction photodiode, a PIN photodiode, an APD photodiode, and the like based on silicon or InP or a semiconductor substrate.

As shown in FIG. 8, the light emitting element array of the light transmitting unit is driven for each light emitting unit, the irradiation position to the target object is changed according to the driving pattern, and the position at which the light reflected by the target object and corresponding to different irradiation positions is incident on the light receiving unit is changed. Based on this, light reflected from a specific optical irradiation surface 3a of the optical irradiation surface array 3 is detected through the specific light detector cell 221' of the light receiving unit 20, and the light detector cell 221' outputs an electrical signal corresponding to the detected light.

The signal processor 23 processes and outputs a signal output from each light detector cell 221', and includes, for example, a low noise amplification module that performs a process of removing noise of a received signal, and amplifying and outputting the received signal. The signal processor 23 may output the processed signal through an output port 231, and the signal output through the output port 231 may be provided to the integrated controller 30. Here, although one output port 231 for outputting a signal from the signal processor 23 is shown, the present invention is not limited thereto, and the output port 231 may be provided in plural.

Meanwhile, in an embodiment of the present invention, optical signal detection may be performed by additionally using a signal from at least one adjacent light detector cell in addition to the signal from any light detector cell for effective optical signal detection. From another viewpoint, the light corresponding to the specific optical irradiation surface 3a can be configured to not be detected by one light detector 221', but to be detected by a plurality of light detectors.

For example, in the case of the adjacent pixel driving method, the light reflected from the specific optical irradiation surface 3a is not detected only in one light detector cell 221', but may also be detected through the adjacent cells for various reasons. In this case, a static unitary detector (STUD) technique may be used. Light, that is, optical signals into adjacent pixels may be gathered easily, for example, in the same way as an RF combiner, and it is advantageous for acquiring a high signal-to-noise ratio (SNR) signal. To this end, the signal processor 23 may include a signal combiner that sums a signal output from each light detector cell, and the signal combiner may be connected to each light detector cell through a separate switch. When switches operating separately are respectively located between each of light detector cells and the signal combiner, a signal from the light detector cell connected to the operated switch according to each switch's operation is provided to the signal combiner. For example, to detect a signal from the light detector cell 221', by driving the switch coupled to light detector cell 221', as well as a switch coupled to at least one other light detector cell adjacent to the light detector cell 221', the signals from the corresponding light detector cells are provided to the signal combiner to be combined. The signal generated by this combining process can be used as the information corresponding to the optical signal detected by the light detector cell 221' which detects the light reflected from the specific optical irradiation surface 3a. As a result, the SNR of the detected optical signal can be increased, and thus it is easy to construct a LIDAR receiver having excellent performance.

Although the present description has described integrated reception for light entering adjacent pixels, the same explanation can be made even when light corresponding to one optical irradiation surface 3a is detected by a plurality of light detectors.

According to an embodiment of the present invention, even when the position of the beam is changed (in a scan method), the group to which the optical signal is coupled may be selectively moved by selective switch driving.

In an embodiment of the present invention, a pixel represents a unit in which an optical signal is detected and may be a physical pixel (for example, one optical detector for detecting an optical signal), but means a pixel in which optical signals are collected by the static unitary detector (STUD) method. For example, when signals from at least one adjacent light detector cell in addition to the signal from an arbitrary light detector cell are combined, the arbitrary light detector cell and the adjacent light detector cells may become pixels corresponding to one light receiving region 3a.

Scanning can be performed in units of pixels. When scanning, the scanning is performed by moving one cell to an adjacent pixel, and may also be gradually performed by moving by, for example, 0.5 pixels (since the light detector cell may exist as an internal subgroup of the receiver of the STUD method).

Figure 10:
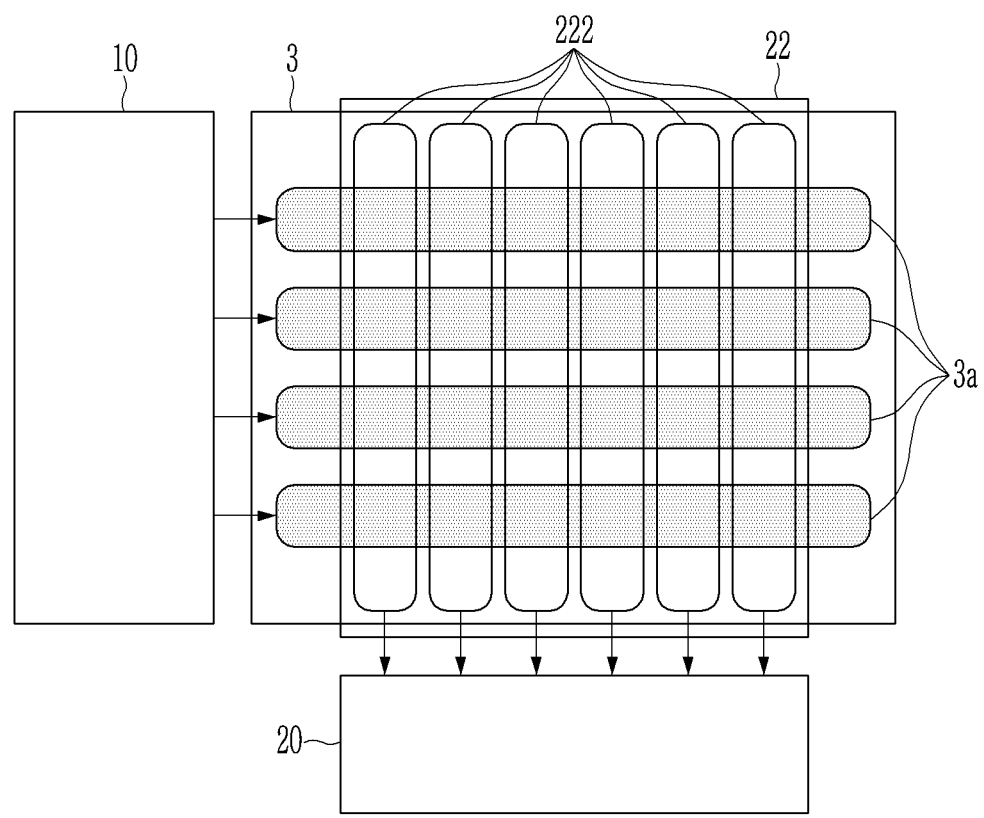
FIG. 10 is a diagram illustrating an optical irradiation surface and a light receiving region capable of receiving light in a light receiving unit which correspond to the light irradiated to a target object by a light transmitting unit.

FIG. 10 is a diagram illustrating an optical irradiation surface 3a and a light receiving region 222 capable of receiving light in a light receiving unit which correspond to the light irradiated to a target object by a light transmitting unit.

As the light emitting element array of the light transmitting unit 10 is driven for each light emitting unit and the light beam is irradiated to the target object for each light emitting unit, a plurality of optical irradiation surfaces, for example, optical irradiation surfaces 3a at four different irradiation positions are formed, as shown in FIG. 10. That is, the optical irradiation surface array 3 is formed, and the optical element surface array 3 may include at least one optical irradiation surface. Here, the light emitting element array of the light transmitting unit 10 is driven according to the light emitting unit for each horizontal line, so that the optical irradiation surface is in the form of a horizontal line. However, the present invention is not limited thereto and may be implemented in various forms (for example, a group form formed of several point areas, etc.).

The light receiving unit 20 has a plurality of light receiving regions 222 by different light detectors, and is configured to have six different light receiving regions 222, for example. There is at least one light receiving region. Here, the light receiving region 222 represents a region in which one light detector cell of the plurality of light detector cells of the light detecting unit 22 detects light. In addition, although the light receiving region is in the form of a vertical line, the present invention is not limited thereto, and may be implemented in various forms (for example, a group form formed of several point areas, etc.).

As the light emitting element array of the light transmitting unit 10 is driven for each light emitting unit, an optical irradiation surface 3*a* of different irradiation positions may be formed, and light reflected from an arbitrary optical irradiation surface 3*a* is detected through the arbitrary light receiving region 222 specified by the light detector in the light receiving unit 20.

The driving pattern for driving the light emitting elements constituting the light emitting element array of the light transmitting unit 10 for each light emitting unit can be varied, and as a result, the optical irradiation surfaces at different positions with respect to the target object are formed, thereby a scan of the target object may be done without mechanical driving. The light receiving unit 20 may determine which light receiving region receives the light reflected from the target object, and for convenience of description, it may be referred to as determining a light receiving position. The light receiving position is determined by driving an arbitrary light detector cell among the plurality of light detector cells. For example, the signal processor (23 in FIG. 1) may be configured to include switches connected to each light detector cell, and may operate an arbitrary switch to operate a corresponding light detector cell in order to determine a light receiving position. Such light receiving position determination may be performed under the control of the integrated controller 30, similar to the method of FIG. 1.

On the other hand, according to the positions of the light emitting elements driven in the light emitting unit in the light emitting element array of the light transmitting unit 10, it is possible to determine which light receiving region of the light receiving unit 20 receives light. For example, when the light emitting elements are driven for each horizontal line in FIG. 10, a light receiving position is determined to correspond to the light emitting elements of a specific horizontal line that is driven, and thus the light reflected by the optical irradiation surface formed by the light emitted by the light emitting elements of a specific horizontal line may be detected through a specific light receiving region corresponding to the determined light receiving position.

By switching the light receiving position, the distance of the target object in the desired direction can be obtained. In addition, three-dimensional coordinates may be obtained by sequentially driving the light emitting element array of the light transmitting unit for each light emitting unit and sequentially driving each light detector cell of the light receiving unit. Accordingly, it is possible to secure a three-dimensional point cloud for the three-dimensional image without rotation or movement of the mechanical means.

Meanwhile, in FIG. 10, the optical irradiation surface and the light receiving region are orthogonal to each other, but the present invention is not limited thereto. Another method capable of spatial resolution may be used, for example, in the aspect of spatial arrangement, when the light transmitting unit transmits light in a circular pattern and the light receiving unit is disposed in a radial shape, they are orthogonal to each other, so that spatial resolution may be provided. As another example, a method capable of spatial decomposition to which the frequency or various modulation schemes described below may be applied may be used.

In the above embodiment, each light emitting unit of the light emitting element array of the light transmitting unit is individually driven, and each light detector cell of the light receiving unit is individually driven to obtain three-dimensional coordinates, but three-dimensional coordinates can also be obtained by driving all light emitting elements of the light emitting element array at the same time and driving all the light detector cells of the light receiving unit.

Figure 11:
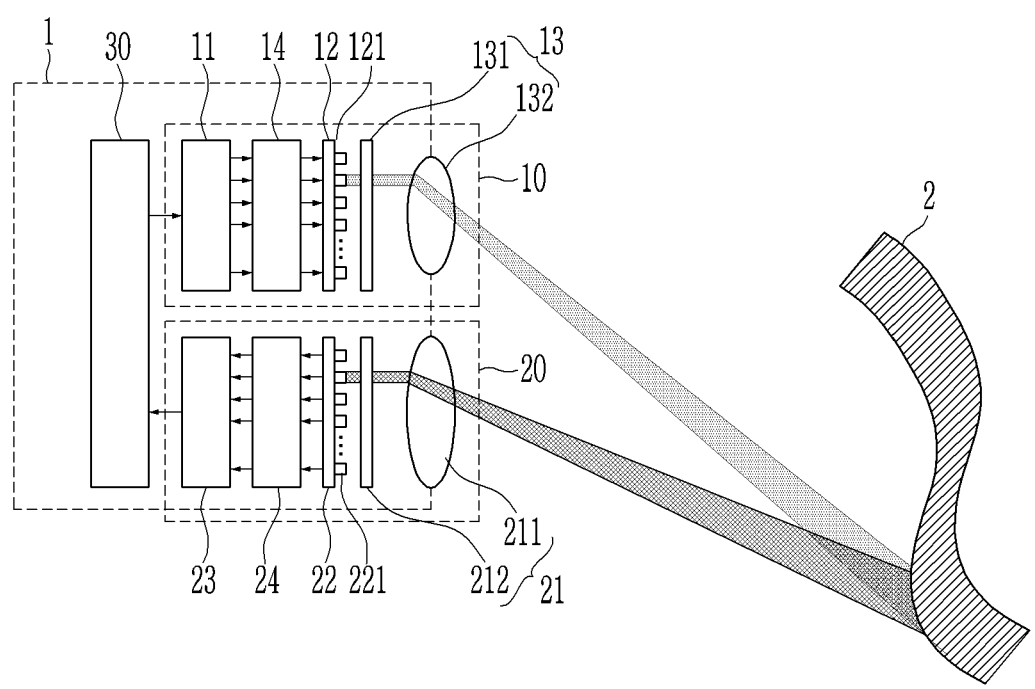
FIG. 11 is a structural diagram of a LIDAR system according to another embodiment of the present invention.

FIG. 11 is a structural diagram of a LIDAR system according to another embodiment of the present invention.

The LIDAR system according to another exemplary embodiment of the present invention includes a light transmitting unit 10, a light receiving unit 20, and an integrated controller 30 in the same manner as the exemplary embodiment above. The light transmitting unit 10 includes a driving unit 11, a light emitting unit composed of a light emitting element array, and a light transmitting optical unit 13. The light receiving unit 20 includes a light receiving optical unit 21, a light detecting unit 22 which includes a plurality of light detector cells for a plurality of light receiving regions, and a signal processor 23. Unlike the above embodiment, the light transmitting unit 10 further includes a light modulator 14 which processes a signal from the driving unit 11 and provides it to the light emitting unit 12 so that light emitted from the light emitting elements of the light emitting unit 12 is modulated at different frequencies. In addition, the light receiving unit 20 further includes a light demodulator 24 which processes a signal transferred from the light detecting unit 22 and provides it to the signal processor 23 so that light received through the light receiving optical unit 21 is demodulated at different frequencies. Detailed description of parts that operate in the same manner as the above embodiment will be omitted. Here, the light modulator 14 and the light demodulator 24 may be configured in various forms, which will be described in more detail with reference to FIG. 12.

Figure 12:
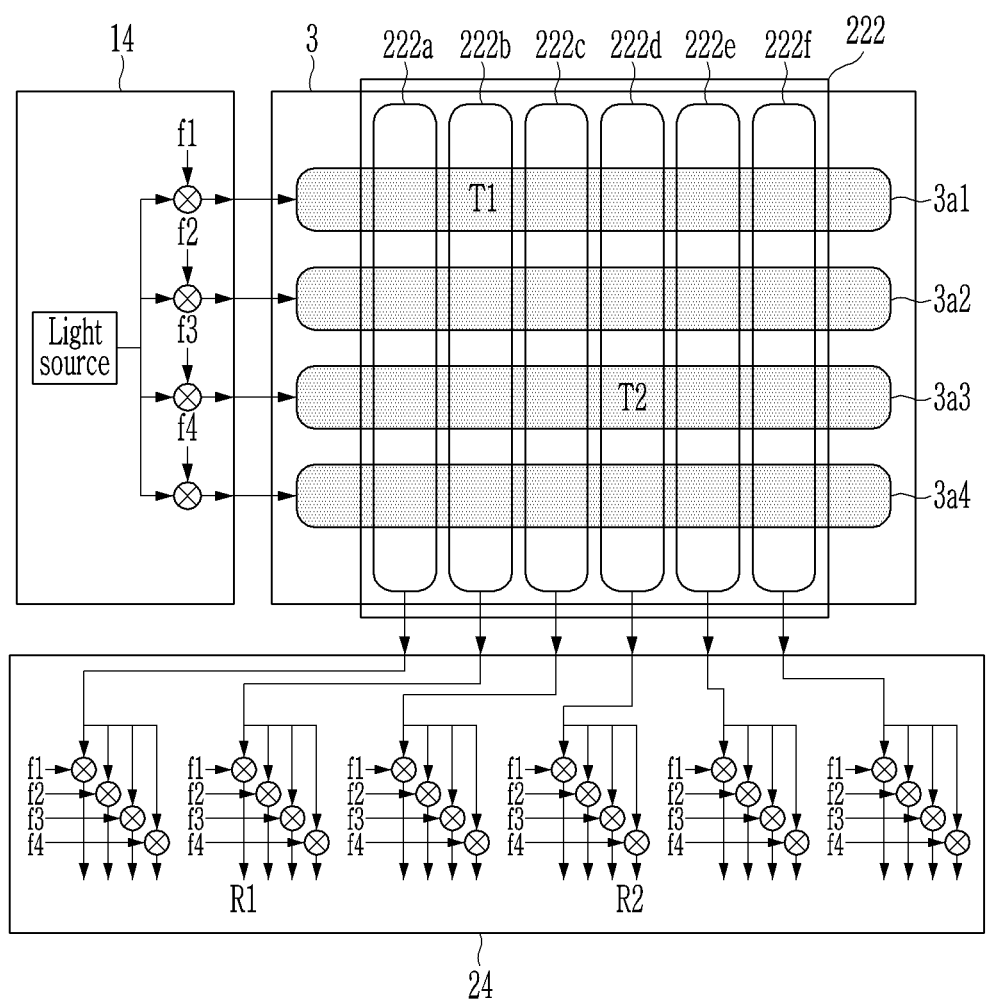
FIG. 12 is a diagram illustrating the structure and operating states of a light modulator and a light demodulator of the LIDAR system shown in FIG. 11.

FIG. 12 is a diagram illustrating the structure and operating states of a light modulator and a light demodulator of the LIDAR system shown in FIG. 11.

As shown in FIG. 12, light emitted from a light source, which is one light emitting element or a plurality of light emitting elements, is modulated at different frequencies f1, f2, f3, and f4 by the light modulator 14, and then transmitted. As a result, optical irradiation surfaces 3*a*1, 3*a*2, 3*a*3, and 3*a*4 corresponding to light modulated at different frequencies f1, f2, f3, and f4 are formed. Light corresponding to these optical irradiation surfaces 3*a*1, 3*a*2, 3*a*3, 3*a*4 is received by different light receiving surfaces 222*a*, 222*b*, 222*c*, 222*d*, 222*e*, and 222*f* through the light receiving optical unit 21 of the light receiving unit 20. Here, the light receiving surfaces 222*a*, 222*b*, 222*c*, 222*d*, 222*e*, and 222*f* correspond to the light receiving regions of the light detecting unit 22.

Light received through each light receiving surface is input to each light receiving region of the light detecting unit 22, and is demodulated at the modulated frequencies f1, f2, f3, and f4 through the light demodulator 24. At this time, even light received by the same light receiving surface can be separated by corresponding to the different light irradiation surfaces 3*a*1, 3*a*2, 3*a*3, 3*a*4 by light demodulation. Therefore, by demodulating, at the corresponding frequency, and obtaining the light reflected at the position irradiated with the light modulated at a specific frequency of the light transmitting unit 10, the distance to the two-dimensional array can be obtained, thereby obtaining a three-dimensional image.

For example, although light modulated at the frequency f1 by the light modulator 14 is irradiated to T1 to form the optical irradiation surface 3*a*1 and the light reflected from the optical irradiation surface 3*a*1 is received by all the light receiving surfaces 222*a*, 222*b*, 222*c*, 222*d*, 222*e*, 222*f*, and 222g, only the signal modulated with f1 is selected by the light demodulator 24 and detected at the position R1. Similarly, although light modulated at the frequency f3 is irradiated to T2 to form the optical irradiation surface 3a3, and the light reflected from the optical irradiation surface 3a3 is received by all the light receiving surfaces 222a, 222b, 222c, 222d, 222e, 222f and 222g, only the signal modulated with f3 is selected by the light modulator 24 and detected at the position R2.

In the LIDAR system having such a structure, even when all the light emitting elements of the light emitting element array are simultaneously driven and all the light detector cells of the light receiving unit are driven, the irradiated signal after modulating at a specific frequency can be separated to simultaneously obtain three-dimensional coordinates. Therefore, a three-dimensional image can be obtained.

In another important aspect, since the frequency modulation method of the continuous wave (CW) signal may be used in the present embodiment, not only the distance but also information on the speed of each point may be obtained. This is similar to the principle in which a frequency-modulated continuous wave (FMCW) radar technology can simultaneously obtain speed as well as distance. In the LIDAR system operating as described above, although the distance to a specific coordinate can be obtained by the modulated frequency, it is possible to secure the speed of the target object according to the change of phase, thereby realizing a three-dimensional image sensor having better performance.

Meanwhile, although the form in which the optical irradiation surface and the light receiving surface are orthogonal in FIG. 11 is taken as an example, the present invention is not limited thereto. For example, it is obvious that other methods capable of spatial decomposition may be used.

In addition, in the present embodiment, a method of separating signals by modulation of orthogonal sinusoidal waveforms is exemplified. However, another method of separating signals (for example, a digital modulation method capable of separating channels) may be employed, and it is obvious that the same effect also exists in this case.

Further, although the signal transmitted in the present invention is not specified, the transmitted signal may be implemented in various forms, such as a pulse, a pulse with modulation, a continuous-wave, a frequency modulated continuous wave (FMCW), and the like. In this case, it is obvious that the light receiving unit can be configured according to each form.

According to an embodiment of the present invention, the light transmitting unit selectively drives the light emitting element array for each light emitting unit without mechanical driving to scan in a predetermined direction without spreading the beam, and the light receiving unit can receive the light reflected from the irradiation position through a plurality of light detector cells without mechanical driving. Therefore, the light transmitting unit and the light receiving unit can be organically driven without mechanical driving means, thereby minimizing the structure of the LIDAR system and miniaturizing and reducing the weight of the LIDAR system. Also, a low cost, durable rider system can be implemented.

In addition, the light receiving unit may change the light receiving region by electrical switching without mechanical movement. Therefore, there is no fear of deterioration of stability and reliability due to mechanical movement.

In addition, since the system according to an embodiment of the present invention is not a way of detecting about 360 degrees while the transmitter and the light receiver rotates, but a way of detecting the front of a certain angle, the system may be efficiently deployed and utilized in various locations such as the front or front and rear sides of the vehicle, which do not require 360-degree detection.

Since the pattern in which the light emitting element array of the light receiving unit is driven and the operation of switching the light receiving position through a plurality of light detector cells of the light receiving unit vary according to the detection direction, the detection distance can be configured differently according to the detection direction. Also, it is an advantage in that the system can be configured to increase the maximum detection distance in a specific direction (for example in front of a vehicle).

In addition, the method of controlling the light receiving path is not a way of being limited to the horizontal and vertical heights of pixels due to the two-dimensional ROIC pixel structure like the ROIC of the conventional array light detector, but a way having a read-out IC (ROIC) pixel structure in a one-dimensional array. Accordingly, it can be configured with a relatively large area of light-receiving chips, so that the ROIC can be configured to allow relatively good light detection.

Although the embodiments of the present disclosure have been described in detail above, the scope of the present disclosure is not limited thereto, and various modifications and improvements by those skilled in the art using the basic concepts of the present disclosure defined in the following claims are also provided, and they also belong to the scope of rights. While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A Laser Imaging, Detection, and Ranging (LIDAR) system, wherein the LIDAR system comprises:
    a light transmitting unit configured to include a plurality of light emitting elements and drive the plurality of light emitting elements by light emitting units to irradiate light to different positions of a target object; and
    a light receiving unit configured to include a plurality of light detector cells and detect, through the plurality of light detector cells, light that is reflected at different positions of the target object and that then is incident to different light receiving positions through a plurality of light receiving regions,
    wherein when misalignment occurs in the LIDAR system, distortion information corresponding to the misalignment is corrected with respect to data obtained by the detected light based on misalignment correction data, and
    wherein when misalignment occurs by at least one of the light emitting elements of the light transmitting unit and the light detector cells of the light receiving unit and distortion of data is generated thereby, distortion information corresponding to the misalignment is corrected with respect to the data obtained by the detected light in real time based on the misalignment correction data obtained through a separate process.

2. The LIDAR system of claim 1, wherein
    the light transmitting unit comprises a light emitting element array in a two-dimensional array including the plurality of light emitting elements, and the plurality of light detector cells correspond to the plurality of light receiving regions.

3. The LIDAR system of claim 2, wherein
a light receiving position indicating which one light receiving region of the plurality of light receiving regions is to detect light is determined based on a position of a light emitting element driven for each light emitting unit in the light emitting element array.

4. The LIDAR system of claim 3, wherein
the one light-receiving region comprises at least one light detector cell, and a light detector cell of a corresponding light receiving region according to the determined light receiving position is driven to output an electrical signal corresponding to incident light.

5. The LIDAR system of claim 2, wherein
the light emitting unit is a horizontal line or a vertical line of the light emitting element array, and the light emitting elements emitting light by horizontal lines or vertical lines of the light emitting element array are driven so that linear light in a horizontal direction or a vertical direction is irradiated.

6. The LIDAR system of claim 2, wherein
the light transmitting unit further comprises a light transmitting optical unit configured to transmit light from a light emitting element,
and the light receiving unit further comprises a light receiving optical unit configured to collect incident light and provide the collected light to the plurality of light detector cells.

7. The LIDAR system of claim 6, wherein
the light transmitting optical unit comprises an optical system configured to extend the light from the light emitting element in a longitudinal direction and transmit the extended light as linear light.

8. The LIDAR system of claim 2, wherein
the light transmitting unit further comprises a light modulator configured to modulate and output light output from the plurality of light emitting elements at different frequencies,
and the light receiving unit further comprises a light demodulator configured to demodulate the incident light with the different frequencies and to provide it to the plurality of light detector cells.

9. The LIDAR system of claim 8, wherein
all the light emitting elements of the light emitting element array are driven at a same time so that the light from all the light emitting elements is modulated at different frequencies and transmitted by the light modulator,
the plurality of light detector cells are all driven, and frequency-specific light detection is performed by demodulation according to different frequencies through the light demodulator.

10. The LIDAR system of claim 1, wherein
the plurality of light emitting elements are sequentially driven for each light emitting unit, and the light receiving unit detects the incident light through a plurality of different light receiving regions corresponding to the sequentially driven light emitting elements.

11. A Laser Imaging, Detection, and Ranging (LIDAR) system, wherein the LIDAR system comprises:
a light transmitting unit configured to include a plurality of light emitting elements and drive the plurality of light emitting elements by light emitting units to irradiate light to different positions of a target object; and
a light receiving unit configured to include a plurality of light detector cells and detect, through the plurality of light detector cells, light that is reflected at different positions of the target object and that then is incident to different light receiving positions through a plurality of light receiving regions,
wherein all the light emitting elements are driven at a same time so that the light from all the light emitting elements is modulated at different frequencies and transmitted,
the plurality of light detector cells are all driven, and frequency-specific light detection is performed by demodulation according to the different frequencies.

12. The LIDAR system of claim 11, wherein
the light transmitting unit comprises a light emitting element array in a two-dimensional array including the plurality of light emitting elements,
and the plurality of light detector cells correspond to the plurality of light receiving regions.

13. The LIDAR system of claim 11, wherein
the light transmitting unit further comprises a light transmitting optical unit configured to transmit light from a light emitting element,
and the light receiving unit further comprises a light receiving optical unit configured to collect incident light and provide the collected light to the plurality of light detector cells.

14. The LIDAR system of claim 13, wherein
the light transmitting optical unit comprises an optical system configured to extend the light from the light emitting element in a longitudinal direction and transmitting the extended light as linear light.

15. The LIDAR system of claim 11, wherein
the light transmitting unit further comprises a light modulator configured to modulate and output light output from the plurality of light emitting elements at the different frequencies,
and the light receiving unit further comprises a light demodulator configured to demodulate the modulated light with the different frequencies and to provide it to the plurality of light detector cells.

* * * * *